(12) United States Patent
Ain et al.

(10) Patent No.: US 7,082,126 B2
(45) Date of Patent: Jul. 25, 2006

(54) FIBER CHANNEL ADDRESS BLOCKING

(75) Inventors: Jonathan Wade Ain, Tucson, AZ (US); Robert George Emberty, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/366,768

(22) Filed: Aug. 4, 1999

(65) Prior Publication Data

US 2006/0072454 A1 Apr. 6, 2006

(51) Int. Cl.
*H04L 12/50* (2006.01)
*H04L 12/56* (2006.01)

(52) U.S. Cl. .................. 370/366; 370/392; 370/906

(58) Field of Classification Search .............. 370/360, 370/351, 366, 368, 389, 381–382, 392, 401, 370/434, 438, 449, 452, 460–462, 906–907; 359/138–139; 709/225, 229; 398/45–57
See application file for complete search history.

(56) References Cited

U.S. PATENT DOCUMENTS 4,833,671 A * 5/1989 Beckner et al. ............. 370/429

5,271,000 A * 12/1993 Engbersen et al. ......... 370/244
6,115,376 A * 9/2000 Sherer et al. ............... 370/389
6,118,776 A * 9/2000 Berman ...................... 370/351
6,185,203 B1 * 2/2001 Berman ...................... 370/351
6,310,882 B1 * 10/2001 Lorenz et al. ............... 370/401
6,317,837 B1 * 11/2001 Kenworthy .................. 713/200
6,584,101 B1 * 6/2003 Hagglund et al. .......... 370/389
6,888,800 B1 * 5/2005 Johnson et al. ............. 370/247

* cited by examiner

*Primary Examiner*—Chi Pham
*Assistant Examiner*—Tri H. Phan
(74) *Attorney, Agent, or Firm*—Dale F. Regelman

(57) ABSTRACT

A method and system including apparatus for detecting and blocking an invalid request to a target wherein fiber channels interconnect the data processing configuration. A request made from a hub such as a fabric switch to an internal fiber channel arbitrated loop is blocked by substituting IDLE characters for the frames of data included with the request. The substitution of IDLE signals can also occur within an internal fiber channel arbitrated loop system where access is blocked to a confidential data storage system. If the request is legitimate, the data frames are passed to the target and the requested data is transmitted back to the requester. If the request is refused as being an unauthorized request, the data frames are replaced with IDLE characters and no transfer of confidential data occurs.

18 Claims, 5 Drawing Sheets

FIBER CHANNEL ADDRESS BLOCKING

BACKGROUND OF THE INVENTION

1. Technical Field

The invention relates to fibre channel computer networks and more particularly to apparatus and method for preventing unwanted access to data at a target device when an invalid source address is detected.

2. Description of the Prior Art

Fibre channel is a general name of a new protocol for flexible information transfer. The fibre channel provides a high speed transfer of large amounts of information while providing an interconnection for various interfaces such as central processing units and data storage devices. The fibre channel permits the transporting of multiple protocols over a common physical interface. The channel protocol refers to a peripheral input/output interface to a host computer that transports large amounts of data between the host computer and the peripheral device such as a data storage system. Data transfer is handled in hardware with little or no software involvement once an input/output operation begins. A network protocol on the other hand usually supports host-to-host communication and refers to an input/output interface that usually supports many small transactions. Fibre channel provides an input/output interface that meets the needs of channel protocol and network protocols.

The fibre channel while increasing the number of devices that can be interconnected is unaware of the content or meaning of the information being transmitted on the channel. The fibre channel also increases the allowable distance between devices and increases the transfer rate of the data. This becomes a problem when one user wants to protect its private data from access from the remainder of the network. Many requests for data can be transmitted on a fibre channel and many sources of data can be connected to the return path of the fibre channel. Thus, unauthorized requests for private data can be made from anyone of the multiple requesters connected to a fibre channel. It is, therefore, an object of the present invention to provide an apparatus and a method for protecting data sources from access by unauthorized requesters.

It would be advantageous to provide a network security technique that permits fibre channel interconnection to a worldwide network while protecting a user's private data from access without authorization.

SUMMARY OF THE INVENTION

The invention provides a technique that permits network access to a storage device while monitoring the source address of the requester to determine whether the requester has been authorized to access the data. A blocking device is positioned between the fibre channel address target and the fabric switch controlling the connection of the source and the target. The blocker inspects all incoming frames of data. The blocker checks the source and destination addresses. If a frame of data is detected that is addressed to an unconfigured source/destination address peer, the frame has its data replaced with IDLE characters. The source could be a host computer requester with a private data storage device being the target. Likewise, the source could be the private data storage with the target being the host computer of the requester. With this invention, unauthorized data is prevented from being transported along the fibre channel while the integrity of the transmission of data is maintained by transporting IDLE characters instead of data frames of information.

The invention provides a number of distinct advantages. The present invention provides apparatus that is positioned in the fibre channel to block either an unauthorized access to private data or to prevent the unauthorized access to a user's network from external network addressing. The invention is unique in that the integrity of the fibre channel is not disturbed since the data frames are replaced by IDLE characters and thereby the transmission along the fibre channel is not interrupted. In the method of the invention, the destination target address is compared to an allowed list of addresses. If a valid comparison is made, the data frame is passed along the fibre channel. If there is no comparison, as would be the case for an unauthorized access, the data frames are converted to IDLE characters and transmitted down the fibre channel. The blocking apparatus of this invention can be positioned to prevent unauthorized access to either a private data source or the entire private user's network.

An object of the present invention, therefore, is to provide an enhanced fibre channel network.

Another object of the present invention is to provide a means and a process to prevent unauthorized access to data through a fibre channel.

Still another object of the present invention is to provide apparatus and an article of manufacture that maintains the integrity of the fibre channel by replacing the data frames with IDLE characters and thereby continuing the data flow along the channel.

The foregoing, and other objects, features and advantages of the invention will become more apparent to those skilled in the art after considering the following detailed description in connection with the accompanying drawing in which reference numbers designate like parts throughout.

DETAILED DESCRIPTION OF THE PREFERRED EMBODIMENTS

The invention concerns the address blocking in a fibre channel that blocks access by an unauthorized user to confidential data of a second user in a network. The frames of data being transmitted down the fibre channel is inspected incoming to the device that is to be protected. In one embodiment of the invention, the blocking device is placed between a private data storage system and the fibre switch of the user holding the confidential data in his private storage system. In a second embodiment of the invention, the blocking device is placed between the fibre switch of the confidential data owner and the confidential owner's network adapter used to access the fibre channel network to the outside world. The blocker includes a comparator that checks the source and authorized addresses thereby permitting access to the owner's private data storage only to authorized users. The blocking device also checks the transmission of data from the private data storage back to the user and again compares the source of authorized addresses. The frames of data in both regulating devices replace the data frame with IDLE characters. The present invention also includes a method for converting the data frames to IDLE characters according to the present invention. For an overview of the fibre channel, reference is made to the book entitled, "The Fibre Channel Bench Reference" by Jeffrey D. Stai, published by the ENDL Publications of Saratoga, Calif. and copyrighted 1996–1999. The book gives an overview of the fibre channel arbitrated loop (FCAL) topology and the fabric switching configurations used in fibre channels. Further details of the fibre channels can be obtained from this book and is useful for understanding the present invention. An overview of the FCAL topology and the use of the invention as positioned between a FCAL target and the interconnection is shown in FIG. 1.

Figure 1:
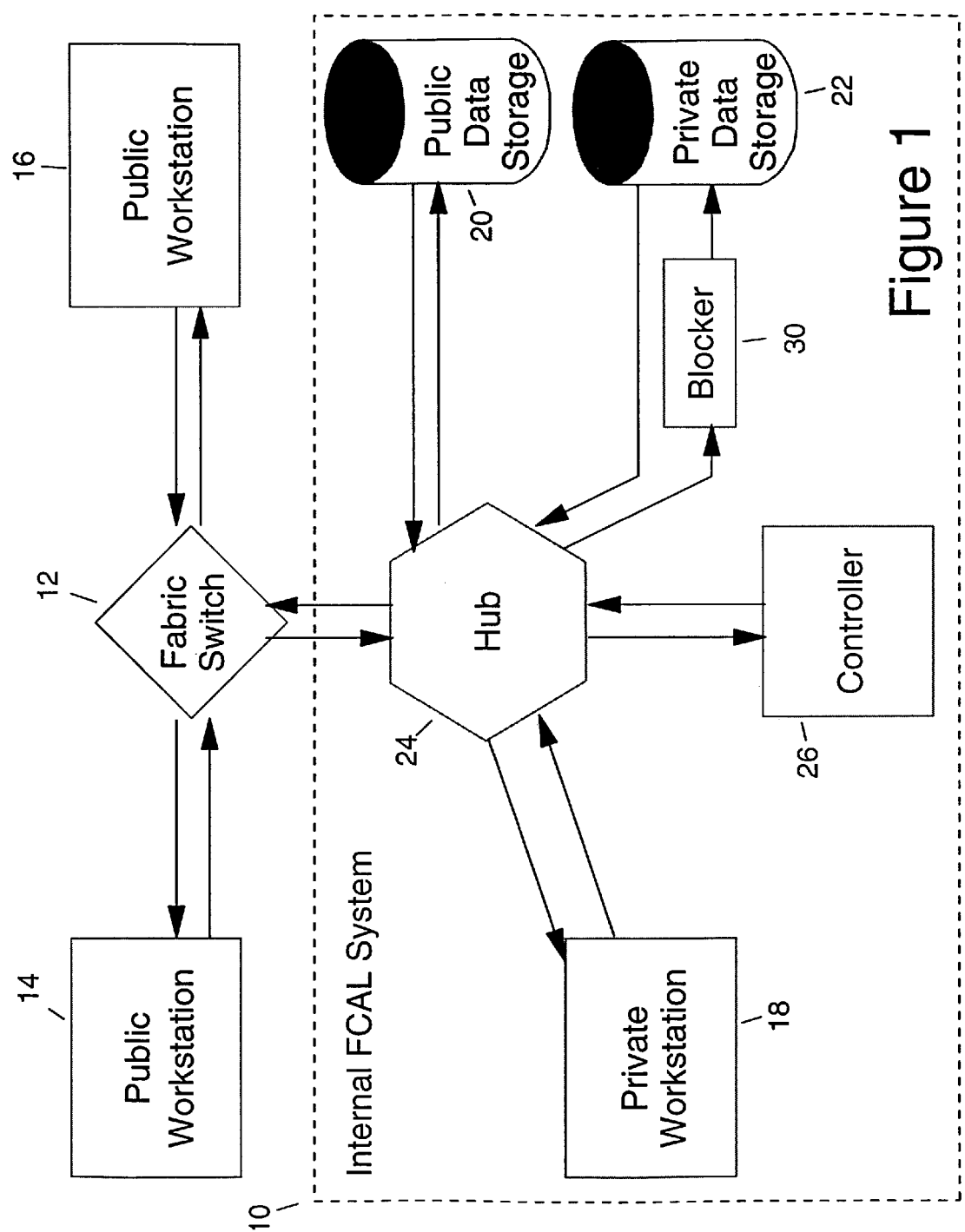
FIG. 1 is a block diagram of the hardware components and interconnection of one illustrative implementation of the invention.

Referring now to FIG. 1, a FCAL system is used as the internal system 10 interconnected with a fabric switch 12. The fabric switch 12 is shown connected to two public work stations 14 and 16 but it should be understood that the showing of two does not limit the number of public work stations that can be interconnected with a fabric switch. The internal FCAL system can include one or more private work stations 18, one or more public data storage systems 20, and one or more private data storage systems 22. The ports of each of the private workstation 18, the public data storage 20, and the private data storage 22 are interconnected in an arbitrated loop represented by the hub 24. A controller 26 operates and controls the interconnectivity of the different systems in the internal FCAL system by controlling the operation of the hub 24. A blocker 30, representing the present invention, is shown positioned between the hub 24 and the private data storage 22. The blocker 30 protects unauthorized access to the private data storage 22 of the internal FCAL system 10. This could happen, for instance, if the public workstation 14, for instance, requests access to the private data storage 22 through the fabric switch 12 and into the internal FCAL system 10 by virtue of loop connection to the hub 24. The blocker 30 prevents unauthorized access to the private data storage system if there is an unauthorized request for access outside of the internal FCAL system. The blocker 30 inspects all incoming frames of data, checks the source and destination addresses included in the frames of data and prevents the access to the private data storage 22 if the user frame is detected that is addressed to an unconfigured source/destination addressed pair, the frame is replaced with IDLE characters and, therefore, the frame is never transmitted to the private data storage 22. A second embodiment in use of the blocker 30 is shown in FIG. 2.

Figure 2:
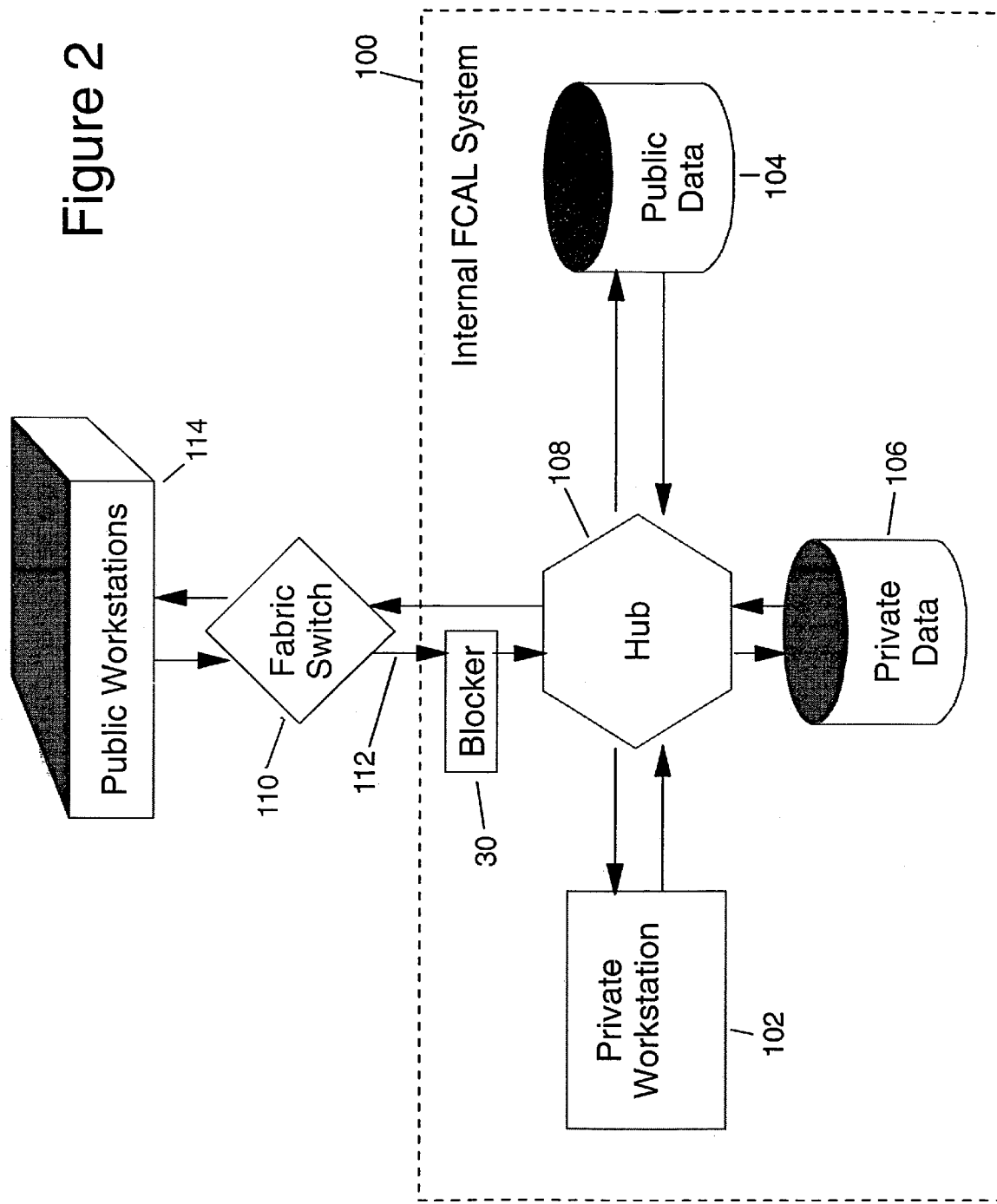
FIG. 2 is a block diagram of the hardware components and interconnections of a second illustrative implementation of the invention.

Referring now to FIG. 2, an internal FCAL system 100 is shown including a private workstation 102, a public data storage 104 and a private data storage 106 all interconnected to a FCAL loop technology in a hub 108. The blocker 30 of the present invention is shown positioned between a fabric switch 110 and the internal FCAL system 100 on an input fibre channel 112. The fibre switch 110 is shown interconnected through fibre channels to a plurality of public workstations 114. The fabric switch 110 represents an interconnection to many workstations and data storages all external to the internal FCAL system 100. In the embodiment shown in FIG. 2, the invention disclosed in blocker 30 is shown positioned between the incoming fibre channel 112 from the fabric switch 110 and intercepts the frames of data on the fibre channel directed towards the hub 108. In this embodiment, the invention is positioned between the FCAL target represented by the internal FCAL system 100 and the fabric switch 110. As in the first embodiment, the blocker 30 inspects all incoming frames to the internal FCAL system 100 and checks the source and destination addresses included into the data frames on the fibre channel 112. Again, if a user data frame is detected by the blocker 30 on the fibre channel 112 that is addressed to an unconfigured source/destination address pair, the data frame is replaced with IDLE characters and thereby no access is permitted by an unauthorized user of the data whether public or private located in the internal FCAL system 100. A block diagram of the blocker 30 of the embodiments of FIGS. 1 and 2 is shown in FIG. 3.

Figure 3:
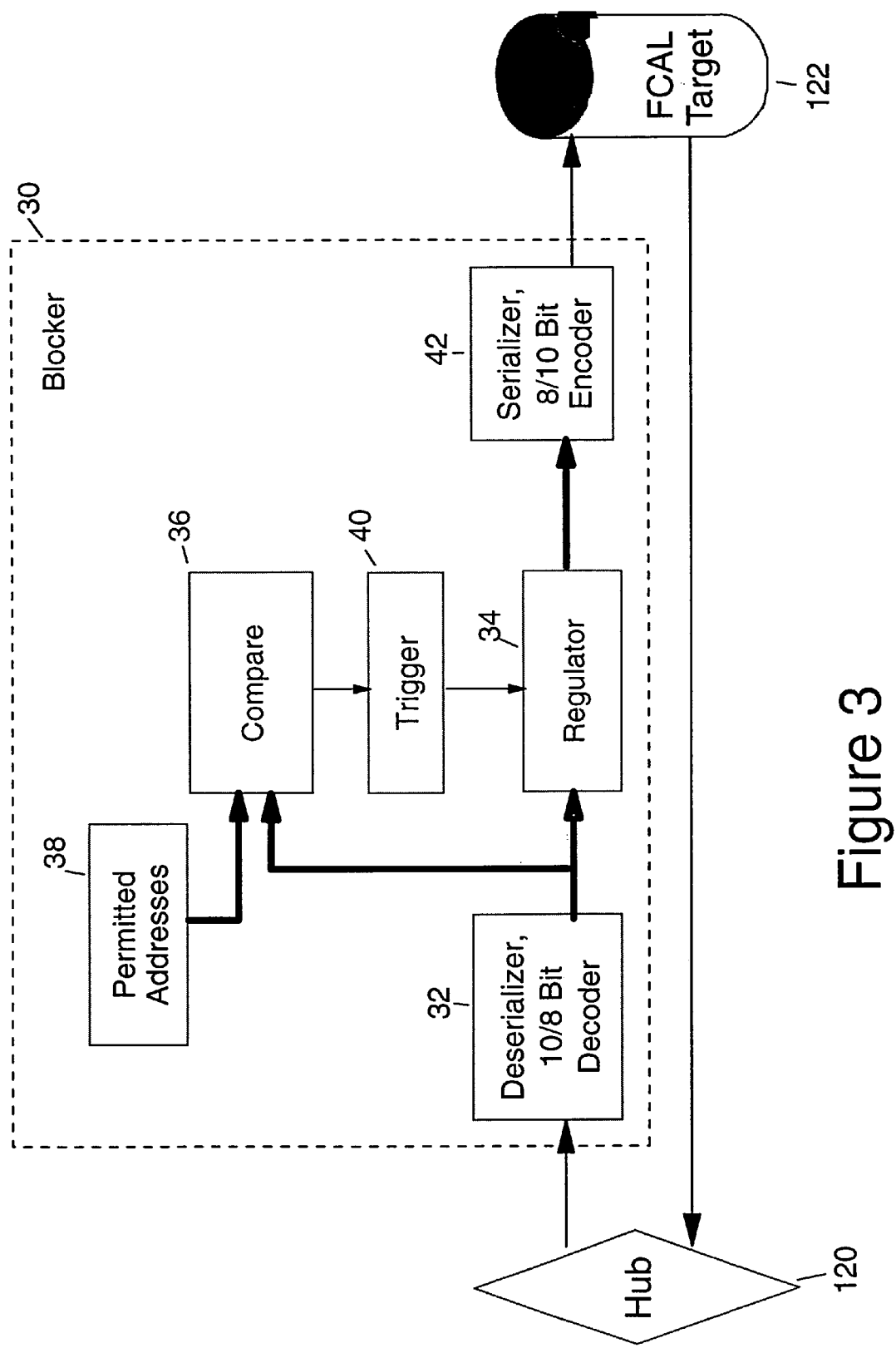
FIG. 3 is a block diagram of the apparatus of the invention as inserted in a fibre channel.

In FIG. 3, the blocker 30 is shown positioned between a hub 120 and a FCAL target 122. The hub 120 represents the hub 24 of the first embodiment in FIG. 1 and it represents the fabric switch 110 in the second embodiment of FIG. 2. The FCAL target 122 represents the private data storage 22 of the FIG. 1 embodiment and the internal FCAL system 100 in the embodiment of FIG. 2. The blocker 30 includes a decoder 32 for receiving the serial data on the fibre channel from the hub 120. The serial data is converted to parallel words in the decoder 32. The parallel data is placed into a regulator 34 and is also directed to a compare circuit 36. The compare circuit 36 compares the parallel data from the decoder 32 and will compare the data address received to a group of permitted addresses as shown in block 38. If the addresses received by the compare circuit 36 compares to the permitted addresses received from block 38, the trigger 40 circuit triggers the regulator 34 to pass the data frame to an encoder circuit 42 for transmission to the FCAL target 122. Thus if a comparison is made, the trigger 40 allows the regulator 34 to pass the data through an encoder 42 and permits the access to the FCAL target 122. However, if the compare circuit 36 does not detect the receipt of a permitted address from the block 38, the trigger 40 signals the regulator 34 to create IDLE characters and access is prevented to the FCAL target 122. A more detailed outline of the circuitry of blocker 30 is shown in FIG. 4.

Figure 4:
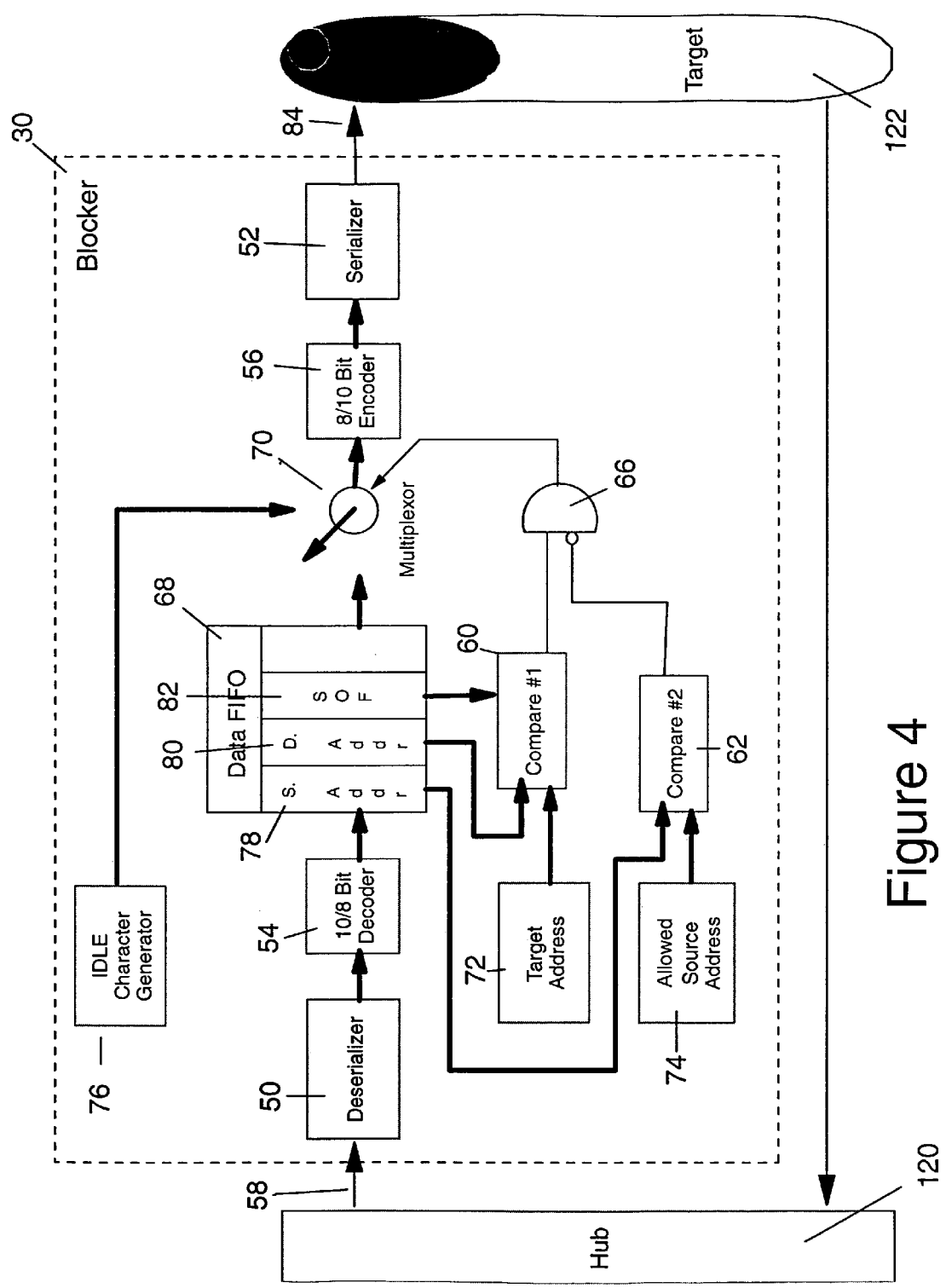
FIG. 4 is a detailed block diagram of the apparatus of the present invention as shown in FIG. 3.

In FIG. 4 further details of the blocker 30 is shown. The fibre channel address blocker 30 is built including three primary sections. A transmit/receive section includes a serializer/deserializer (SERDES) chip shown as a serial parallel deserializer 50 and a parallel to serial serializer 52 together with a decoder 54 and an encoder 56. The deserializer 50 receives serial data along a fibre channel 58 and converts the serial data into ten bit parallel words. The parallel words from the deserializer 50 are directed to the decoder 54 which decodes the ten bit words and packages them in groups of four as 32-bit words with a parity bit for each byte of the word. These 32-bit words are characterized as frame data and include control characteristics that are received within the most significant bits of the 32-bit words. The decoder 54 and the encoder 56 are typically a TQ9303 chip.

The output of the decoder 54, the frame data comprising 32-bit parallel words, are directed to a data first in/first out block, the data FIFO 68. The data FIFO 68 is the second primary section of the fibre channel address blocker 30. The data FIFO 68 is 37 bits wide, 32 bits of data, 4 bits of parity and one bit which carries the control signal so that each frame word can be tracked as data or control. The remaining primary section of the blocker 30 is the control logic section which includes a compare #1 60, a compare #2 circuit 62, an AND gate 66 and a multiplexor 70. The blocker 30 also includes a target address store 72 and an allowed source addresses store 74. An IDLE character generator 76 is included for directing IDLE characters into the system as needed to block the access to the data of the FCAL target 122. In FIG. 4, serial data transfer is represented by a thin line, and parallel data transfer is represented by a bold line.

As serial data is received along the fibre channel 58 from the hub 120, it is directed to the deserializer 50 and the decoder 54 where the data is converted into parallel data and moved into the first location of the data FIFO 68. The first FIFO location is called the source address S Addr 78. When the next clock cycle occurs, the first data word is shifted into the second FIFO location, the destination identification D Addr 80. A new word is shifted into the first FIFO location S Addr 78. At the next clock cycle, the first word is shifted into the second FIFO location, a new word is shifted into the first FIFO location and the second word is converted into a third FIFO location called the start of frame SOF 82. The shifting of the data through the data FIFO 68 continues as long as the link to the fibre channel 58 is operational with all data and control words moving through the data FIFO 68. The data FIFO 68 and its control logic are contained within an Altera FLEX 10K field programmable logic array (FPGA). The control logic contains a bank of 24-bit registers at which the target addresses and their corresponding allowed initiator addresses are stored.

When a start of frame character word is detected in a data FIFO 68 at SOF 82, the data FIFO 68 is indicating that a new data frame is being received. The start of frame signal is directed to the compare #1 circuit 60. The data word in the second cell, the D Addr 80 contains the frame type within the routing control field and the destination identification data. The frame data from the D Addr 80 is directed to the input of the compare 60. If the frame is determined to be a FC-4 device data frame, the compare 60 compares the destination identification to the target address from the target address store 72 stored in the register bank in the control logic section of the blocker 30. The next 32-bit frame word is now contained in the first location of the data FIFO 68, the S Addr 78 FIFO location. This frame word contains the 24-bit source address and the output of this data FIFO 68 location, the S Addr 78 location, is directed to the compare 2 circuit 62. The compare 62 of the control logic section compares the source address to the allowed addresses as contained in the allowed address store 74. If the destination address from location 80 of the data FIFO 68 is found to match a target address from the target address store 72, the compare #1 circuit 60 permits a comparison in the compare #2 circuit 62 of the source address from the FIFO location 78 to the allowed addresses from the allowed address store 74. If a match is found, the compare 62 of the control logic allows the frame data to continue through the data FIFO 68 for transmittal via the Mux 70 to the FCAL target 122. If the destination address from the FIFO location 80 of the data FIFO 68 is not found in the list of target addresses from the target address store 72, the frame is allowed to pass through the data FIFO 68, the encoder 56 and the serializer 52, and is transmitted to the FCAL target 122.

If a match is found for the destination address from the FIFO location 80 in the compare #1 circuit 60, but the source address from the FIFO location 78 is not on the list of allowed addresses from the allowed address store 74, then the compare #2 circuit 62 along the NOT line activates an AND gate 66 which permits the transmission of IDLE characters from the IDLE character generator 76 to be transmitted through the Mux 70, the encoder 56, and the serializer 52, to FCAL target 122 via fibre 84. The control logic of the blocker 30 asserts the IDLE characters, the IDLE characters in turn cause the encoder 56 to ignore the transmit data inputs and to transmit the IDLE characters until an end of frame character is detected in the last FIFO location of the data FIFO 68. This action causes the data frames to apparently disappear.

If the start of frame signal from FIFO location 82 activates the compare #1 circuit 60 and the destination identification from FIFO location 80 matches an address from the target address store 72, the compare #1 circuit 60 activates the compare #2 circuit 62. The activation of the compare #2 circuit 62 causes the comparison of the source address from FIFO location 78 to be compared with the allowed addresses from the allow address store 74 and if again the source address is in the allowed addresses, the NOT line from the compare #2 circuit 62 is directed to the AND gate 66 which allows the transmittal of the data from the data FIFO 68 to the FCAL target 122 via the encoder 56 and the serializer 52.

The generation of the IDLE characters causes the frames to "disappear", in reality the data frames are replaced by IDLE characters. It should be understood that data frames could be status frames or command frames, that is, any frame that could be a Level FC4 frame.

The control logic section of the blocker 30 is described as particular types of gates and blocks of circuitry to compare address data signals but it should be understood that the control logic described in FIG. 4 is representative of operational steps and should not be limited to the actual logic detail described in FIG. 4. Thus according to the invention, the blocker 30 accepts serial data from a fibre channel, converts the serial data to a parallel data and senses the frame words of the parallel data in order to detect a start of frame signal which then permits the comparison of the destination identification signal to the target address and the comparison of the source address from the incoming data to allowed addresses stored within the blocker 30. If the source address is one of the allowed addresses, the request for data is continued to the FCAL target 122 via the encoder and serializer.

As shown in FIG. 4, the blocker 30 through its control logic section compares the serialized data from the fibre channel 58 which has been converted to parallel data and transmitted to data FIFO 68, senses a start of frame data which then permits a comparison of the destination identification to the target address and a comparison of the source address to the addresses permitted access to the FCAL target 122. If the destination address has sensed and location 80 of data FIFO 68 is found to match the target address from the target address store 72 then the control logic compares the source address to the list of allowed addresses from the allowed address store 74. If a match is found with the list of allowed addresses, the control logic allows the data frame to continue through the data FIFO 68 for transmission to the FCAL target 122. If a match is found for the destination address but the source address is not on the allowed list of addresses from the allowed address store 74, then the control logic causes the IDLE character generator to generate IDLE characters to the FCAL target 122. The IDLE characters are generated and transmitted until an end of frame character is detected in the last location of the data FIFO 68. This action essentially causes the frames of data to disappear by being substituted by IDLE characters. The data frames that travel through the data FIFO 68 and are not blocked are directed to an encoder and a parallel to serial converter to be encoded into the serial form for transmission through a fibre channel to the target 122.

The decoder 54 and the encoder 56 are typically TQ9303 encoder/decoder (ENDEC) chips. The serial parallel deserializer 50 and the parallel to serial serializer 52 are typically a Triquint fibre channel chip set and form the receive/transmit section of the blocker 30. The serial to parallel deserializer 50 is typically a TQ9502 chip which is a serializer/deserializer (SERDES) chip. The parallel to serial serializer 52 is typically a TQ 9501 serializer chip which converts the parallel words from the encoder 56 into a serial stream to be transmitted on the fibre channel 84 to the target 122.

The control logic pseudo code for the control section of the blocker 30 is as follows. Referring to FIG. 4, if the FIFO location 82 is equal to a start of frame (SOF) and the FIFO location 78 includes a control signal in the source identification that the requesting frame contains an FC4 device data frame type;
AND
FIFO location 80 does not contain a destination identification that compares to the target address;
OR
If FIFO location 82 is equal to a start of frame and FIFO location 82 includes a control signal that the requesting device contains FC 4 device data frame type and the source address from the FIFO location 78 successfully compares to the allowed address in the compare #1 60;
THEN
Allow access to target until the FIFO location 82 signals an end of frame data (EOF);
OTHERWISE
If the FIFO location 82 is equal to a start of frame (SOF) and the FIFO location 80 includes a control signal that the requesting device contains FC4 device data frame type;
AND
The source address from the FIFO location 78 does not successfully compare to the allowed addresses;
THEN
Assert IDLE characters until the FIFO location 82 signals an end of frame (EOF) signal.

Figure 5:
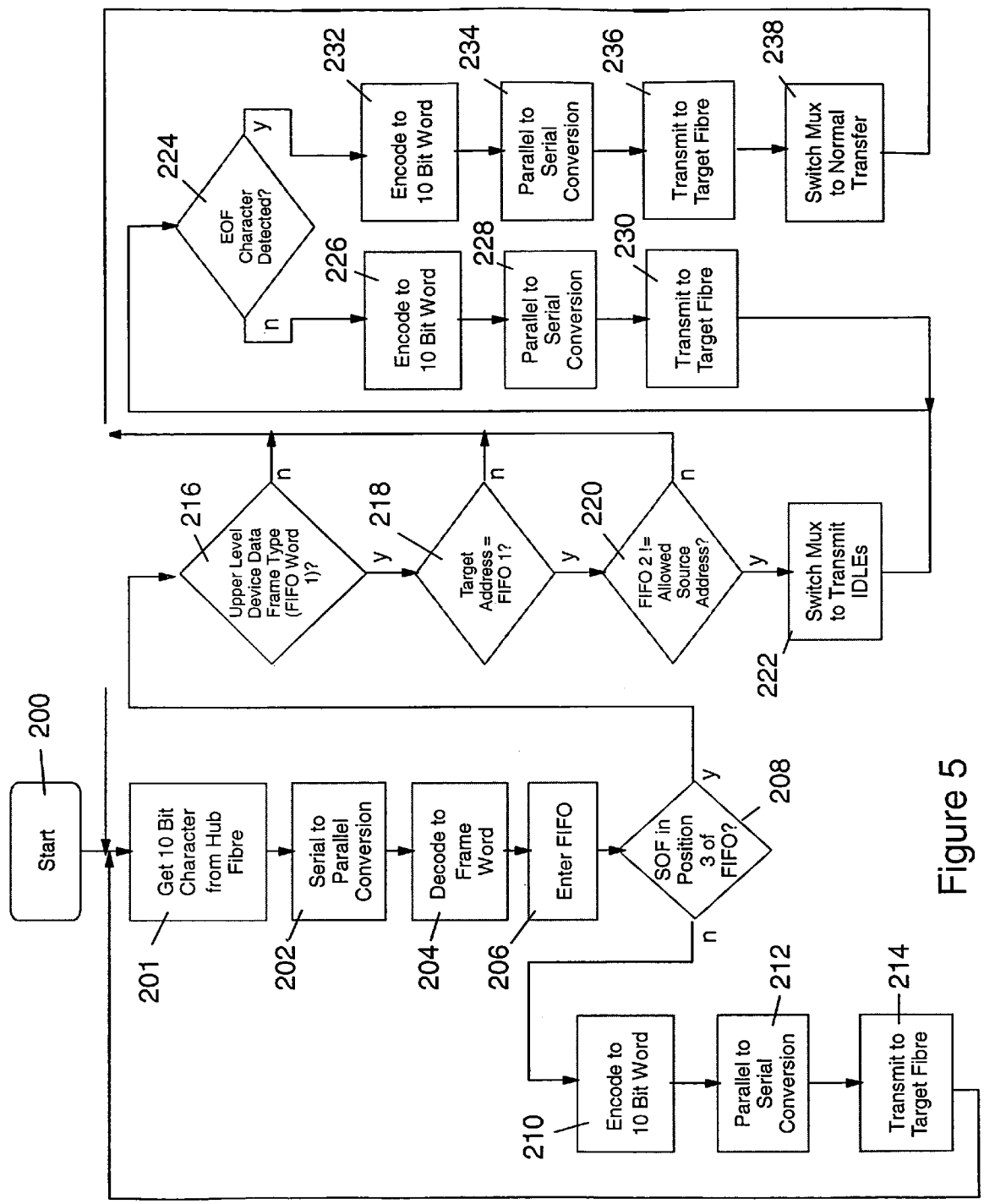
FIG. 5 is a flowchart showing a sequence of steps to control the unauthorized accessing of data while maintaining the integrity of the fibre channel in accordance with the present invention.

A flowchart for the fibre channel address blocking method and process according to the present invention is shown in FIG. 5. Referring to FIG. 5, a block 201 shows that data is received from a hub which could be a fibre channel arbitrated loop or a fabric switch and directed to a serial to parallel conversion such as shown in block 202. The data from the serial to parallel conversion block 202 is directed to a decode to frame data word as shown in a block 204. The parallel data from the frame word is then entered into a first in first out (FIFO) circuit as shown in a block 206. The next step is a decision block where a start of frame is detected or not as shown in decision block 208. If a start of frame word is not detected the NO line is taken to a block 210 where a sensing of the FIFO frame word is continued and the word is transmitted. If the start of frame word is detected, the flow continues from decision block 208 along the YES line to a block 216 where the data frame type, the target address, and the allowed source addresses are presented from the FIFO as represented by blocks 216, 218 and 220 respectively. If any of the compares fail in decision blocks 216, 218, or 220, the flow reverts to the start block 200. If all three compares are satisfied, that is, that an FC4 device data frame type is detected, and the target address matches the destination address in the FIFO, and the source address is not found on the list of allowed addresses, then the flow goes to block 222, and the multiplexer is switched to transmit IDLE characters.

The flow then goes to a decision block 224 where the end of frame (EOF) character is detected. If in decision block 224, an end of frame character is not detected, then the word is encoded in a block 226, serialized in a block 228, and transmitted to the target as shown in a block 230. The flow goes to the decision block 224 again to check the next word for the end of frame character. If an end of frame (EOF) character is detected, the EOF character is encoded in a block 232, serialized in a block 234, and transmitted to the target via fibre as shown in a block 236. The flow then goes to a block 238, where the multiplexer is switched to normal transfer mode, where data from the FIFO is transmitted in a normal fashion. The flow then reverts back to the START block 200.

Thus, what has been disclosed in the present invention is a method, apparatus, and article of manufacture for blocking a fibre channel address request wherein the incoming frames are inspected and checked for the source and destination addresses. If the address is authorized, the request is completed and the frame is transferred to the requesting device. If the address detected is from an unconfigured source/destination address, the frame is replaced with IDLE characters to prevent any transfer of unauthorized data to the requester.

Using the foregoing specification, the invention may be implemented as a machine, process, or article of manufacture by using standard programming or engineering techniques to produce computer software, firmware, hardware, or a combination thereof. Any resulting programs may be embodied within one or more computer usable media such as memory devices or transmitting devices, thereby making a computer program product or article of manufacture according to the invention. As such, the terms "article of manufacture" and "computer program product" as used in the following claims are intended to encompass a computer program existing on any memory device or in any transmitting device. Memory devices include fixed (hard) disk drives, diskettes, optical disks, magnetic tape, and semiconductor memories such as ROM, PROM, etc. Transmitting devices include the internet, electronic bulletin board and message/note exchanges, telephone/modem-based network communication, hard-wired/cable communication network, cellular communication, radio wave communication, satellite communication, and other stationary or mobile network systems and communication links. A computer program product as described above may be used by transmitting it via any of the foregoing transmitting devices.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

Although the invention is described here and with reference to the preferred embodiments, one skilled in the art will readily appreciate that other apparatus, methods and applications may be substituted for those set forth herein without departing from the spirit and scope of the present invention. For example, specific chips and chips that are described herein together with representative logic items. The disclosure of specific items should not limit the invention and accordingly, the invention should only be limited by the claims below.

We claim:

1. A method to limit access to information using a fibre channel arbitrated loop system, comprising the steps of:
inspecting an incoming data frame comprising serial data;
determining the source address and the destination address included in said incoming data frame;
providing permitted address information;
providing an IDLE character generator;
providing a deserializer;
providing a decoder;
providing said serial data to said deserializer;
converting said serial data to a plurality of ten bit parallel words;
directing said plurality of parallel words to said decoder;
packaging said plurality of words in groups of four as 32-bit words comprising a parity bit for each byte;
placing said parallel data into a regulator;
providing a trigger circuit, wherein said trigger circuit is in communication with said regulator;
providing an encoder, wherein said encoder is in communication with said regulator;
comparing said parallel data to said permitted address information;
operative if said incoming data frame is addressed to an unconfigured source/destination addressed pair, replacing said incoming data frame with IDLE characters;
operative if said incoming data frame is not addressed to an unconfigured source/destination addressed pair, triggering said regulator to pass said parallel data to said encoder;
converting said plurality of parallel words to said serial data; and
passing said serial data to said destination address.

2. The method of claim 1, further comprising the steps of:
providing said 32-bit words to a data first in/first out block;
locating the 32-bit word comprising said source address; and
locating the 32-bit word comprising said destination address.

3. The method of claim 2, further comprising the steps of:
comparing said source address to said permitted address information;
operative if said source address matches said permitted address information, comparing said destination address to said permitted address information; and
operative if said destination address matches said permitted address information, passing said frame data through said data first in/first out block.

4. The method of claim 3, further comprising the steps of:
detecting a start of frame signal;
operative if said source address does not match said permitted address information, replacing each of said 32-bit words with IDLE characters; and
detecting an end of frame signal.

5. The method of claim 3, further comprising the steps of:
detecting a start of frame signal;
operative if said destination address does not match said permitted address information, replacing each of said 32-bit words with IDLE characters; and
detecting an end of frame signal.

6. A method to limit access to information using a fibre channel arbitrated loop system, comprising the steps of:
receiving an incoming data frame, wherein said data frame comprises serial data;
providing a deserializer;
providing said serial data to said deserializer;
converting said serial data to a plurality of ten bit parallel words;
providing a regulator;
providing said plurality of parallel words to said regulator;
providing a trigger circuit, wherein said trigger circuit is in communication with said regulator;
providing a decoder;
providing said plurality of parallel words to said decoder;
packaging said plurality of parallel words in groups of four as 32-bit words comprising a parity bit for each byte;
providing a data first in/first out block;
providing said 32-bit words to a data first in/first out block;
detecting a start of frame signal;
locating the 32-bit word comprising a source address;
locating the 32-bit word comprising a destination address;
providing permitted address information;
providing an encoder;
providing an IDLE character generator;
comparing said source address to said permitted address information;
operative if said source address does not match said permitted address information, replacing each of said 32-bit words with IDLE characters;
operative if said source address matches said permitted address information, comparing said destination address to said permitted address information;
operative if said destination address does not match said permitted address information, replacing each of said 32-bit words with IDLE characters;
operative if said destination address matches said permitted address information;
triggering said regulator to pass said parallel data to said encoder;
converting said plurality of parallel words to said serial data; and
passing said serial data to said destination location.

7. An article of manufacture for use in a fibre channel configuration network system comprising a computer useable medium having computer readable program code disposed therein for limiting access to information, the computer readable program code comprising a series of computer readable program steps to effect:
inspecting an incoming data frame comprising serial data;
determining the source address and the destination address included in said incoming data frame;
providing said serial data to a deserializer in communication with a decoder;
converting said serial data to a plurality of ten bit parallel words;
directing said plurality of parallel words to said decoder;
packaging said plurality of parallel words in groups of four as 32-bit words comprising a parity bit for each byte;
comparing said parallel data to previously-determined permitted address information;
placing said parallel data into a regulator in communication with a triggering circuit and an encoder;
operative if said incoming data frame is addressed to an unconfigured source/destination addressed pair, replacing said incoming data frame with IDLE characters;
operative if said incoming data frame is not addressed to an unconfigured source/destination addressed pair, triggering said regulator to pass said parallel data to an encoder in communication with said regulator;

converting said parallel data to said serial data;

passing said serial data to said destination address.

8. The article of manufacture of claim 7, wherein said computer readable program code further comprises a series of computer readable program steps to effect:

providing said 32-bit words to a data first in/first out block;

locating the 32-bit word comprising said source address; and locating the 32-bit word comprising said destination address.

9. The article of manufacture of claim 8, wherein said computer readable program code further comprises a series of computer readable program steps to effect:

comparing said source address to said permitted address information;

operative if said source address matches said permitted address information, comparing said destination address to said permitted address information; and operative if said destination address matches said permitted address information, passing said frame data through said data first in/first out block.

10. The article of manufacture of claim 9, wherein said computer readable program code further comprises a series of computer readable program steps to effect:

detecting a start of frame signal;

operative if said source address does not match said permitted address information, replacing each of said 32-bit words with IDLE characters; and detecting an end of frame signal.

11. The article of manufacture of claim 9, wherein said computer readable program code further comprises a series of computer readable program steps to effect:

detecting a start of frame signal;

operative if said destination address does not match said permitted address information, replacing each of said 32-bit words with IDLE characters; and detecting an end of frame signal.

12. An article of manufacture for use in a fibre channel configuration network system comprising a computer useable medium having computer readable program code disposed therein for limiting access to information using a fibre channel protocol, the computer readable program code comprising a series of computer readable program steps to effect:

receiving an incoming data frame, wherein said data frame comprises serial data;

providing said serial data to a deserializer in communication with a decoder;

converting said serial data to a plurality of ten bit parallel words;

providing said plurality of parallel words to a regulator in communication with a triggering circuit and an encoder;

providing said plurality of parallel words to said decoder;

packaging said plurality of parallel words in groups of four as 32-bit words comprising a parity bit for each byte;

providing said 32-bit words to a data first in/first out block;

detecting a start of frame signal;

locating the 32-bit word comprising a source address;

locating the 32-bit word comprising a destination address;

comparing said source address to a permitted address information;

operative if said source address does not match said permitted address information, replacing each of said 32-bit words with IDLE characters;

operative if said source address matches said permitted address information, comparing said destination address to said permitted address information;

operative if said destination address does not match said permitted address information, replacing each of said 32-bit words with IDLE characters;

operative if said destination address matches said permitted address information:

triggering said regulator to pass said parallel data to a encoder;

converting said plurality of parallel words to said serial data; and passing said serial data to said destination location.

13. A computer program product usable with a programmable computer processor having computer readable program code embodied therein to limit access to information using a fibre channel protocol, comprising:

said computer readable program code which causes said programmable computer processor to inspect an incoming data frame comprising serial data;

computer readable program code which causes said programmable computer processor to determine the source address and the destination address included in said incoming data frame;

computer readable program code which causes said programmable computer processor to convert said serial data to a plurality of ten bit parallel words;

computer readable program code which causes said programmable computer processor to package said plurality of ten bit parallel words in groups of four as 32-bit words comprising a parity bit for each byte;

computer readable program code which causes said programmable computer processor to place said parallel data into a regulator in communication with a triggering circuit and an encoder;

computer readable program code which causes said programmable computer processor to compare said parallel data to previously-determined permitted address information;

computer readable program code which, if said incoming data frame is addressed to an unconfigured source/destination addressed pair, causes said programmable computer processor to replace said incoming data frame with IDLE characters;

computer readable program code which, if said incoming data frame is not addressed to an unconfigured source/destination addressed pair, causes said programmable computer processor to trigger said regulator to pass said parallel data to an encoder in communication with said regulator;

computer readable program code which causes said programmable computer processor to convert said parallel data to said serial data;

computer readable program code which causes said programmable computer processor to pass said serial data to said destination address.

14. The computer program product of claim 13, further comprising:

computer readable program code which causes said programmable computer processor to provide said 32-bit words to a data first in/first out block;

computer readable program code which causes said programmable computer processor to locate the 32-bit word comprising said source address; and computer readable program code which causes said programmable computer processor to locate the 32-bit word comprising said destination address.

15. The computer program product of claim 14, further comprising:
   computer readable program code which causes said programmable computer processor to compare said source address to said permitted address information;
   computer readable program code which, if said source address matches said permitted address information, causes said programmable computer processor to compare said destination address to said permitted address information; and
   computer readable program code which, if said destination address matches said permitted address information, causes said programmable computer processor to pass said frame data through said data first in/first out block.

16. The computer program product of claim 15, further comprising:
   computer readable program code which causes said programmable computer processor to detect a start of frame signal;
   computer readable program code which, if said source address does not match said permitted address information, causes said programmable computer processor to replace each of said 32-bit words with IDLE characters; and
   computer readable program code which causes said programmable computer processor to detect an end of frame signal.

17. The computer program product of claim 15, further comprising:
   computer readable program code which causes said programmable computer processor to detect a start of frame signal;
   computer readable program code which, if said destination address does not match said permitted address information, causes said programmable computer processor to replace each of said 32-bit words with IDLE characters; and
   computer readable program code which causes said programmable computer processor to detect an end of frame signal.

18. A computer program product usable with a programmable computer processor having computer readable program code embodied therein to limit access to information using a fibre channel protocol, comprising:
   computer readable program code which causes said programmable computer processor to receive an incoming data frame, wherein said data frame comprises serial data;
   computer readable program code which causes said programmable computer processor to convert said serial data to a plurality of ten bit parallel words;
   computer readable program code which causes said programmable computer processor to package said plurality of parallel words in groups of four as 32-bit words comprising a parity bit for each byte;
   computer readable program code which causes said programmable computer processor to detect a start of frame signal;
   computer readable program code which causes said programmable computer processor to locate the 32-bit word comprising a source address;
   computer readable program code which causes said programmable computer processor to locate the 32-bit word comprising a destination address;
   computer readable program code which causes said programmable computer processor to compare said source address to previously-determined permitted address information;
   computer readable program code which, if said source address does not match said permitted address information, causes said programmable computer processor to replace each of said 32-bit words with IDLE characters;
   computer readable program code which, if said source address matches said permitted address information, causes said programmable computer processor to compare said destination address to said permitted address information;
   computer readable program code which, if said destination address does not match said permitted address information, causes said programmable computer processor to replace each of said 32-bit words with IDLE characters;
   computer readable program code which, if said destination address matches said permitted address information causes said programmable computer processor to convert said plurality of parallel words to said serial data, and to pass said serial data to said destination location.

* * * * *